(12) United States Patent
Itoh

(10) Patent No.: US 6,989,943 B2
(45) Date of Patent: Jan. 24, 2006

(54) ZOOM LENS SYSTEM AND IMAGE PICKUP APPARATUS HAVING ZOOM LENS SYSTEM

(75) Inventor: Yoshinori Itoh, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/916,335

(22) Filed: Aug. 11, 2004

(65) Prior Publication Data
US 2005/0036211 A1 Feb. 17, 2005

(30) Foreign Application Priority Data
Aug. 11, 2003 (JP) .............................. 2003-207161

(51) Int. Cl.
*G02B 15/14* (2006.01)

(52) U.S. Cl. .................. 359/689; 359/676; 359/680; 359/682; 359/716; 359/740; 359/753; 359/784

(58) Field of Classification Search ................ 359/676, 359/680–682, 689, 716, 740, 753, 784
See application file for complete search history.

(56) References Cited

U.S. PATENT DOCUMENTS

| 4,662,723 | A | 5/1987 | Imai |
| 4,733,952 | A | 3/1988 | Fujioka |
| 4,802,747 | A | 2/1989 | Horiuchi |
| 5,434,710 | A | 7/1995 | Zozawa |
| 6,735,020 | B2 * | 5/2004 | Sekita .................. 359/682 |
| 6,744,564 | B2 * | 6/2004 | Mihara et al. ............. 359/680 |
| 6,809,879 | B2 * | 10/2004 | Mihara ..................... 359/682 |
| 6,836,375 | B1 * | 12/2004 | Ito ........................... 359/682 |
| 6,844,986 | B2 * | 1/2005 | Nanba ...................... 359/689 |
| 6,856,467 | B2 * | 2/2005 | Iyama ....................... 359/682 |
| 6,888,683 | B2 * | 5/2005 | Itoh .......................... 359/686 |
| 2003/0012567 | A1 * | 1/2003 | Itoh ............................ 396/72 |
| 2004/0076416 | A1 * | 4/2004 | Mihara ....................... 396/72 |
| 2004/0085472 | A1 * | 5/2004 | Mihara ...................... 348/335 |

FOREIGN PATENT DOCUMENTS

| JP | 60-031110 | 2/1985 |
| JP | 63-81313 | 4/1988 |
| JP | 3-296706 | 12/1991 |
| JP | 6-66008 | 8/1994 |
| JP | 7-52256 | 6/1995 |
| JP | 10-213745 | 8/1998 |
| JP | 2001-100098 | 4/2001 |

* cited by examiner

*Primary Examiner*—Evelyn A. Lester
(74) *Attorney, Agent, or Firm*—Morgan & Finnegan, L.L.P.

(57) ABSTRACT

A zoom lens system, includes a first lens unit, a second lens unit, and a third lens unit. The second lens unit is moved to the object side in zooming such that an interval between the first lens unit and the second lens unit at a telephoto end becomes smaller than an interval between the first lens unit and the second lens unit at a wide angle end. The first lens unit includes a first lens element, a second lens element, and a third lens element. The first lens element has an aspherical surface of a shape that the negative refracting power decreases from a lens central portion to a lens peripheral portion. The second lens element is formed in a meniscus shape which is convex on the object side. A refractive index of a material constituting the first and second lens elements is appropriately selected.

11 Claims, 17 Drawing Sheets

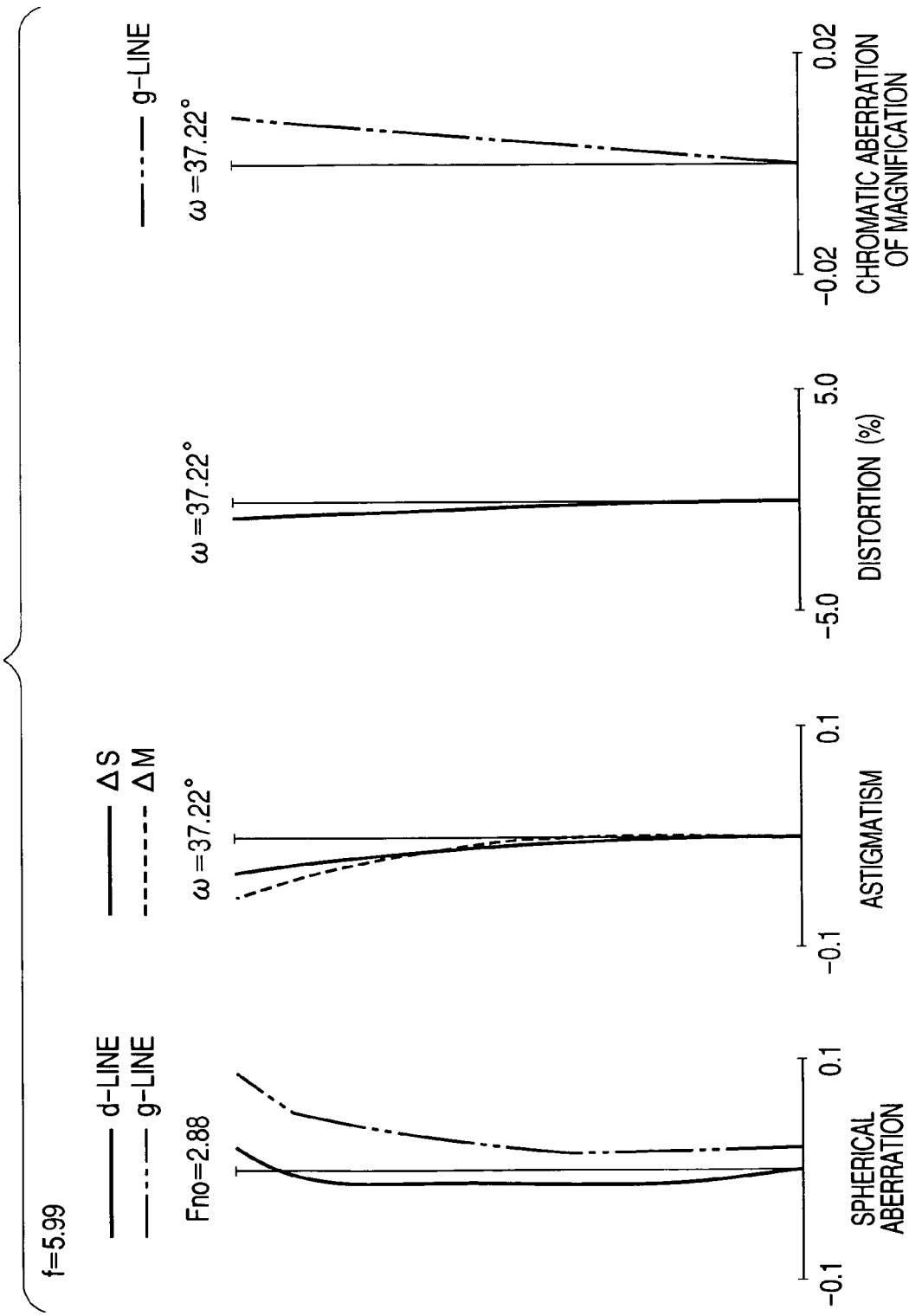

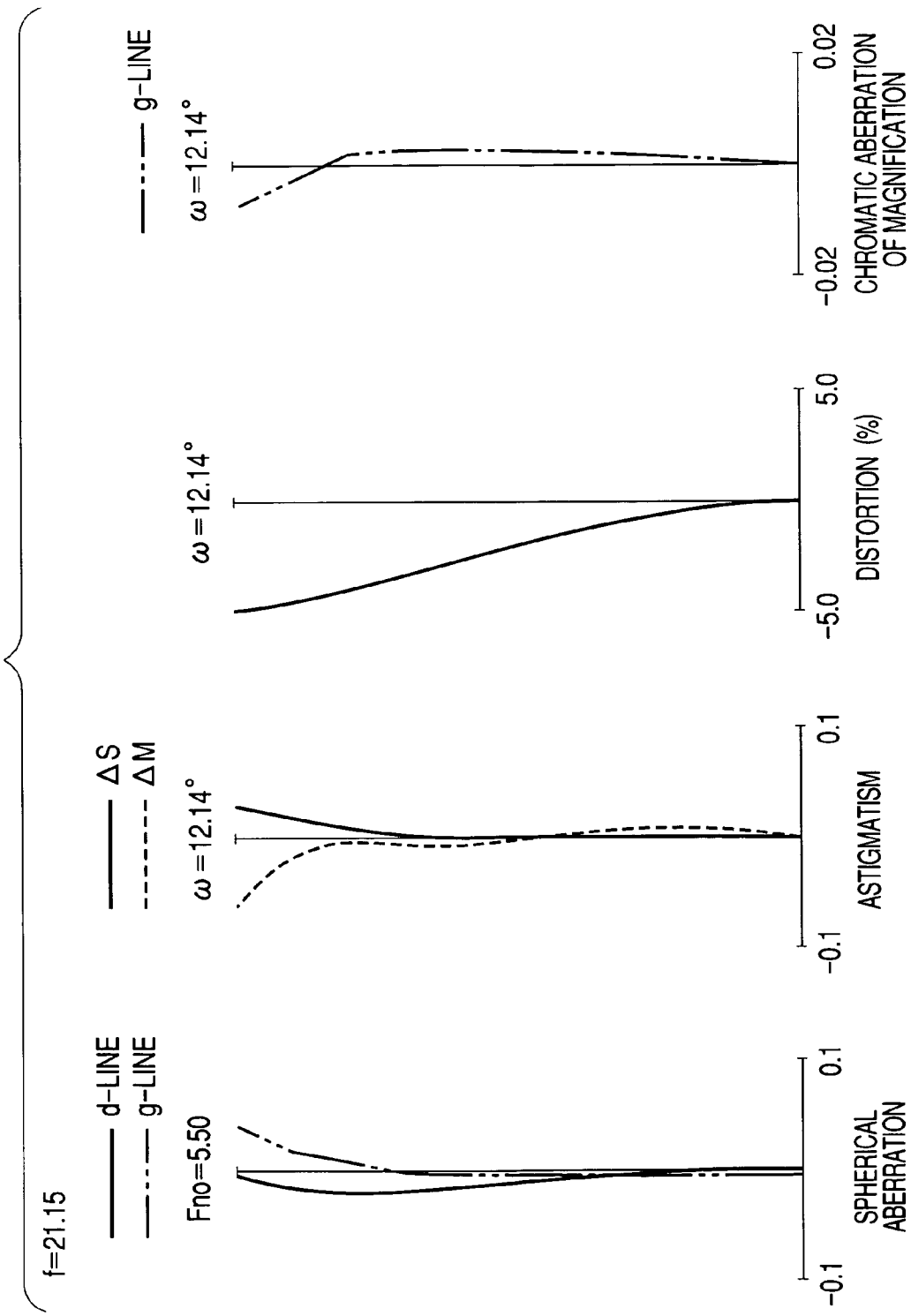

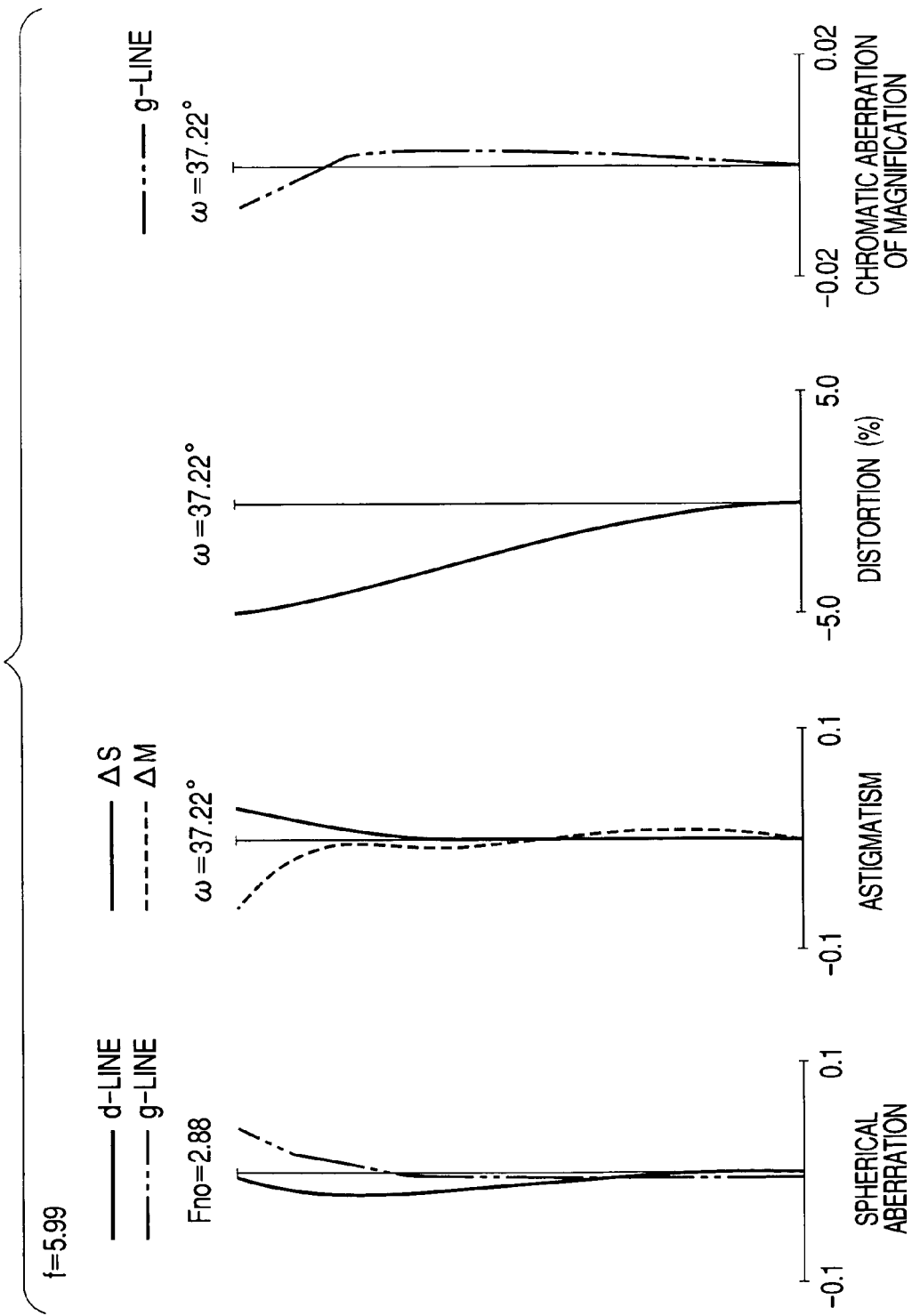

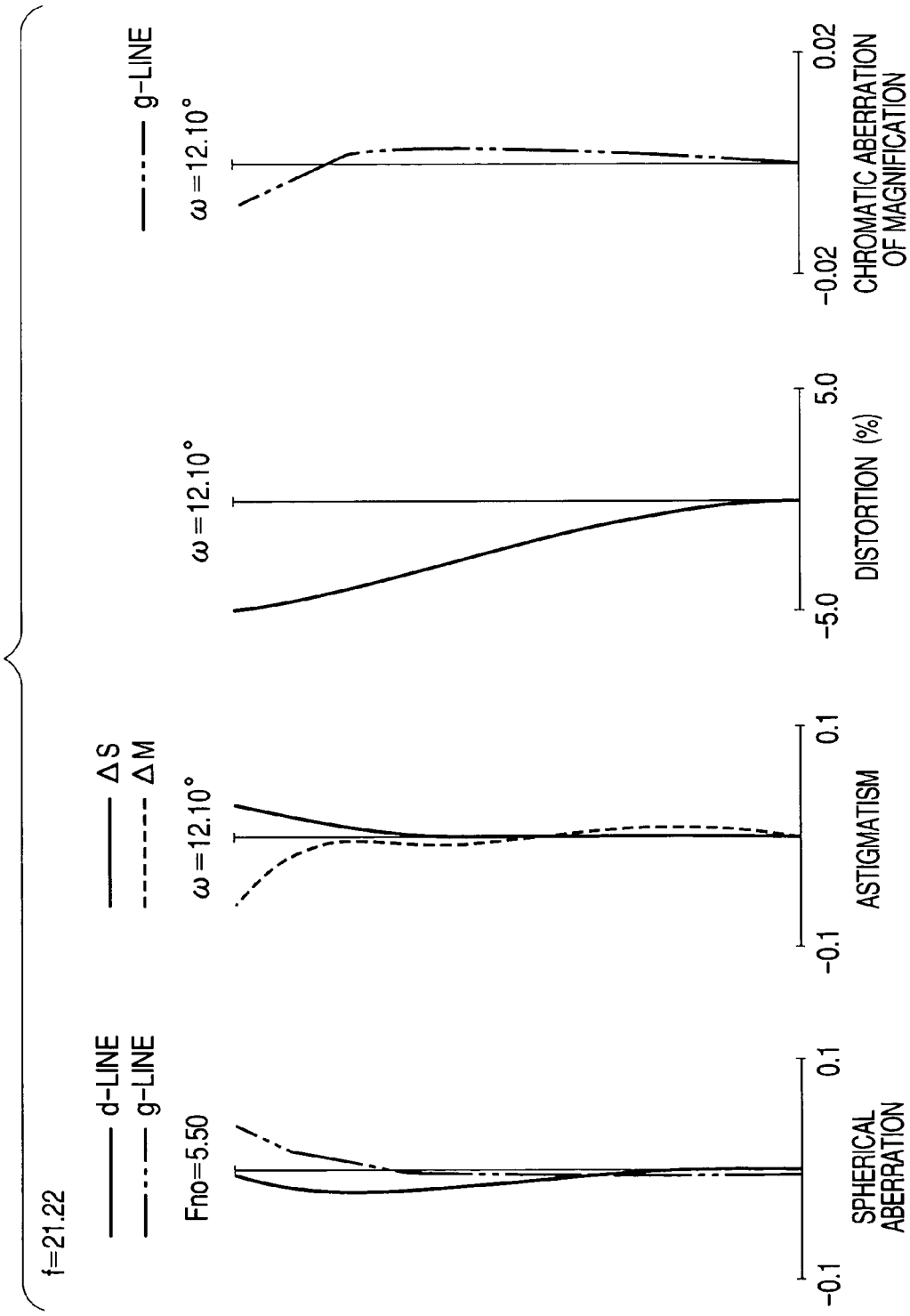

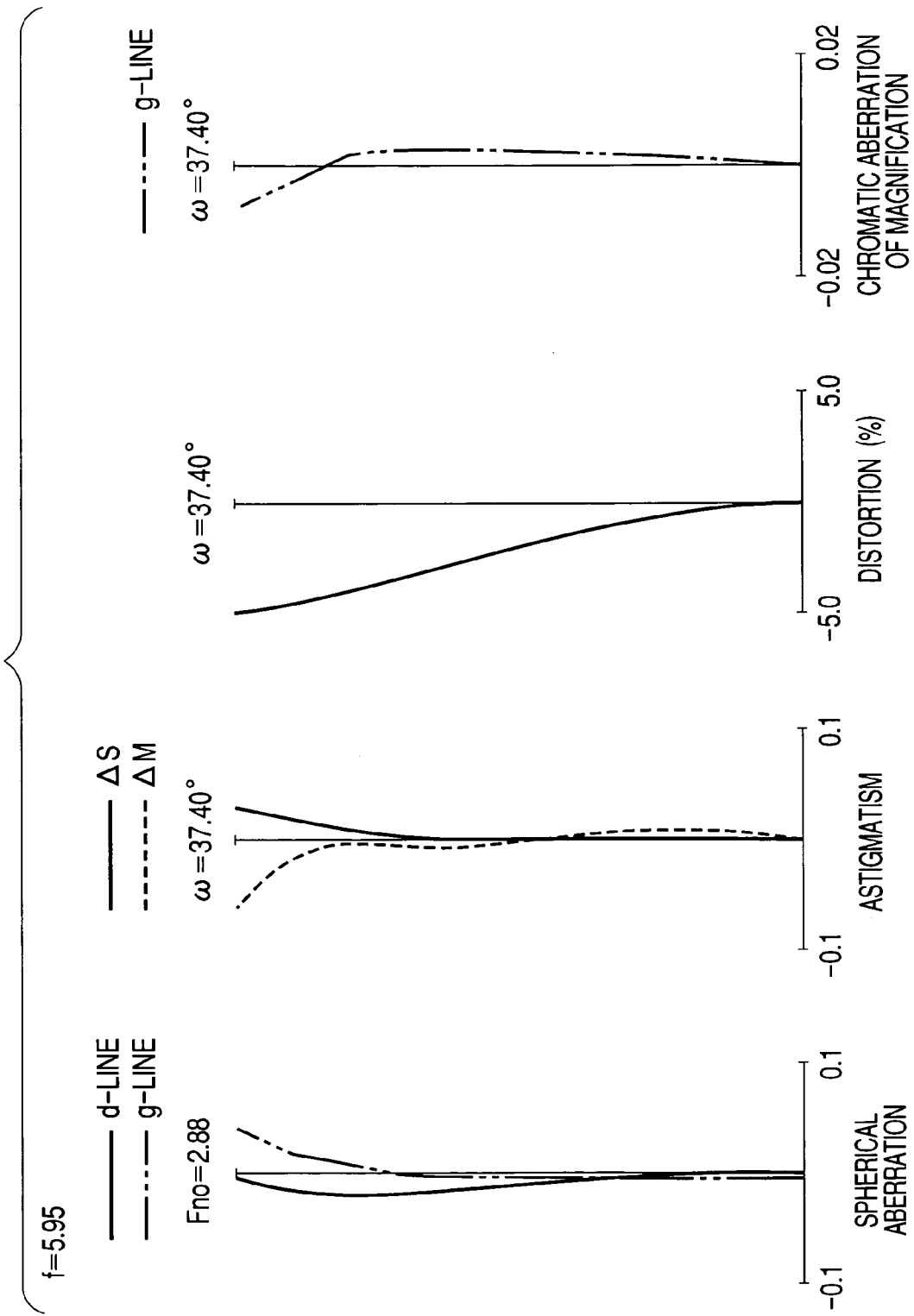

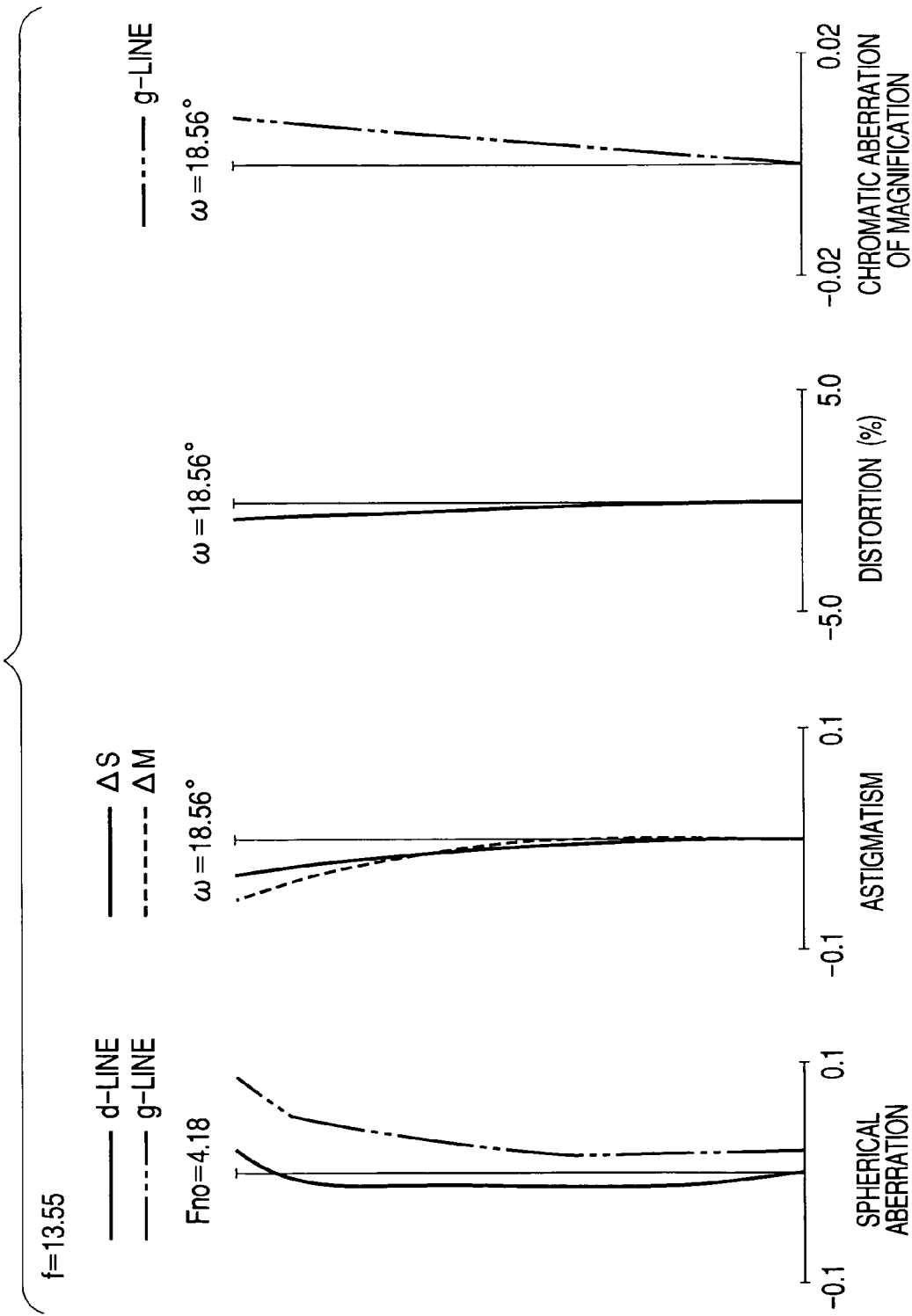

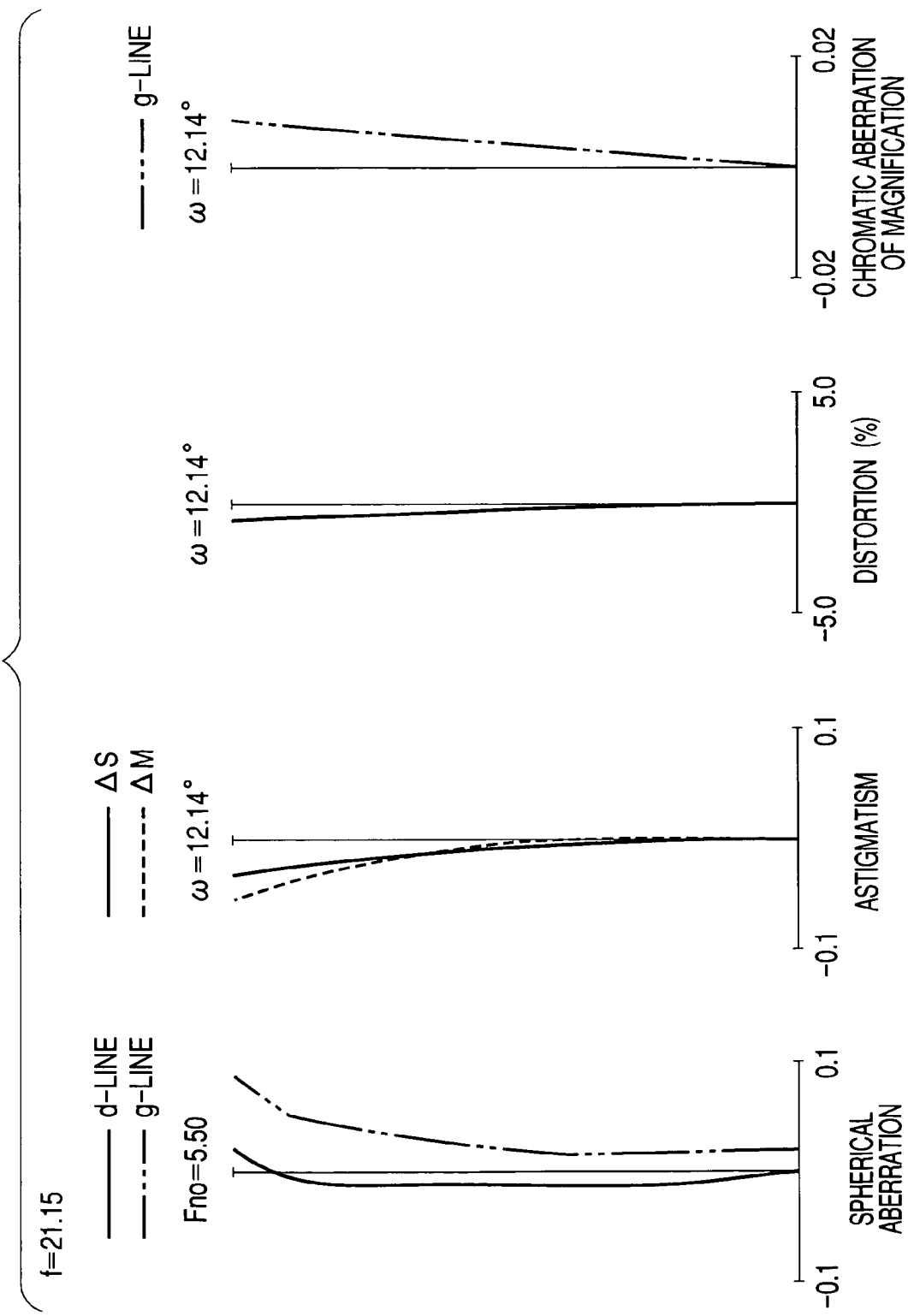

ZOOM LENS SYSTEM AND IMAGE PICKUP APPARATUS HAVING ZOOM LENS SYSTEM

This application claims priority from Japanese Patent Application No. 2003-207161 filed Aug. 11, 2003, which is hereby incorporated by reference herein.

BACKGROUND OF THE INVENTION

1. Field of the Invention

The present invention relates to a zoom lens system, and more particularly to a zoom lens system suitably used in an image taking optical system in a video camera, a digital still camera, or the like.

2. Related Background Art

In recent years, with improvement in a function of an image pickup apparatus using a solid-state image pickup element, such as a video camera or a digital still camera, a compact zoom lens system having a high resolution has been desired as an image taking optical system used for the image pickup apparatus.

In general, a lens type of three to five units has been known as a zoom lens used for the image pickup apparatus (optical apparatus) using the solid-state image pickup element such as a CCD sensor of a video camera, a digital still camera, or the like (for example, Japanese Patent Application Laid-Open No. S63-081313 (corresponding to U.S. Pat. No. 4,802,747) and Japanese Patent Application Laid-Open No. H03-296706). The lens type includes at least a lens unit with positive refracting power, a lens unit with negative refracting power, and a lens unit with positive refracting power. Of these lens units, a lens unit nearest an object is fixed during zooming.

On the other hand, an optical system in which the entire lens length is extremely short, a view angle is wide in view of a property of a still image, and an optical performance is higher than that in a zoom lens used for a moving image video camera has been desired as a zoom lens for a digital still camera for taking the still image using a solid-state image pickup element.

A zoom lens which includes a lens unit with negative refracting power and a lens unit with positive refracting power has been known as a lens system which has a wide angle range, is bright, and obtains a high performance even when a zoom ratio is a relatively low zoom ratio of 2.5 to 3 (for example, Japanese Patent Publication No. H06-066008 (corresponding to U.S. Pat. No. 4,662,723)). With this zoom lens, zooming is performed by changing an air interval between the respective lens units.

There has been known a zoom lens which includes a first lens unit with negative refracting power, a second lens unit with positive refracting power, and a third lens unit with positive refracting power and in which an interval between the second lens unit and the third lens unit increases during zooming from a wide angle end to a telephoto end (for example, Japanese Patent Publication No. H07-052256 (corresponding to U.S. Pat. No. 4,733,952)).

Also, there has been known a zoom lens which includes a first lens unit with negative refracting power, a second lens unit with positive refracting power, and a third lens unit with positive refracting power and in which an interval between the second lens unit and the third lens unit reduces during zooming from a wide angle end to a telephoto end (for example, U.S. Pat. No. 5,434,710).

Also, there has been known a zoom lens which includes a first lens unit with negative refracting power, a second lens unit with positive refracting power, a third lens unit with positive refracting power, and a fourth lens unit with positive refracting power and in which an interval between the second lens unit and the third lens unit reduces during zooming from a wide angle end to a telephoto end, and the fourth unit is fixed during zooming (for example, Japanese Patent Application Laid-Open No. S60-031110).

Also, there has been known a zoom lens which includes a first lens unit with negative refracting power, a second lens unit with positive refracting power, a third lens unit with positive refracting power, which are disposed in order from an object side (for example, Japanese Patent Application Laid-Open Nos. H10-213745 and 2001-100098). The first lens unit includes three or more lenses and has at least one aspherical surface.

In recent years, with reduction in size of the image pickup apparatus and increase in the number of pixels of the image pickup element, a zoom lens which has a high optical performance and which is small in the entire lens system has been desired as a zoom lens used for a digital still camera, a video camera, and the like. In addition, it has been desired to record a high quality still image by the video camera. Therefore, a lens system which has a high optical performance but is small is required.

In general, with respect to a negative lead type zoom lens, in order to reduce the number of lenses in the entire lens system to simplify a lens structure and in order to obtain a preferable optical performance over the entire zoom range while attempting to widen a view angle, it is necessary to suitably set refracting power to each of the lens units, a lens structure of each of the lens units, a surface provided as an aspherical surface if the aspherical surface is used, and the like.

When the selections of the refracting power to each of the lens units, the lens structure, and the surface provided as the aspherical surface are unsuitable, an effect obtained by providing the aspherical surface is small. Therefore, a variation in aberration accompanying zooming becomes larger, so that it is hard to obtain a high optical performance over the entire zoom range.

SUMMARY OF THE INVENTION

An object of the present invention is to provide a zoom lens system having a novel structure, which provides a desirable zoom ratio, and which has a high optical performance capable of being sufficiently applying to even the case where, for example, a solid-state image pickup element having a large number of pixels is used.

An illustrated zoom lens system of the present invention includes a first lens unit having negative refracting power (optical power=a reciprocal of a focal length), a second lens unit having positive refracting power, and a third lens unit having positive refracting power, which are disposed in order from an object side to an image side. The second lens unit is moved toward the object side in zooming from a wide angle end to a telephoto end such that an interval between the first lens unit and the second lens unit at the telephoto end becomes smaller than an interval between the first lens unit and the second lens unit at the wide angle end. The first lens unit includes a first lens element having negative refracting power, a second lens element having negative refracting power, and a third lens element having positive refracting power, which are disposed in order from the object side to the image side. The first lens element has an aspherical surface of a shape that the negative refracting power decreases from a lens central portion to a lens peripheral portion. The second lens unit is formed in a meniscus shape which is convex on the object side. Here, conditional expressions of 1.78<Ng1 and 1.75<Ng2 are satisfied, where Ng1 and Ng2 are a refractive index of a material constituting the first lens element and a refractive index of a material constituting the second lens element, respectively.

BRIEF DESCRIPTION OF THE DRAWINGS

FIGS. 2A, 2B, and 2C are aberration graphs of the zoom lens system according to Embodiment 1;

FIGS. 4A, 4B, and 4C are aberration graphs of the zoom lens system according to Embodiment 2;

FIGS. 6A, 6B, and 6C are aberration graphs of the zoom lens system according to Embodiment 3;

FIGS. 8A, 8B, and 8C are aberration graphs of the zoom lens system according to Embodiment 4;

DETAILED DESCRIPTION OF THE PREFERRED EMBODIMENTS

Hereinafter, a zoom lens system and an image pickup apparatus having the zoom lens system according to embodiments of the present invention will be described.

Figure 1:
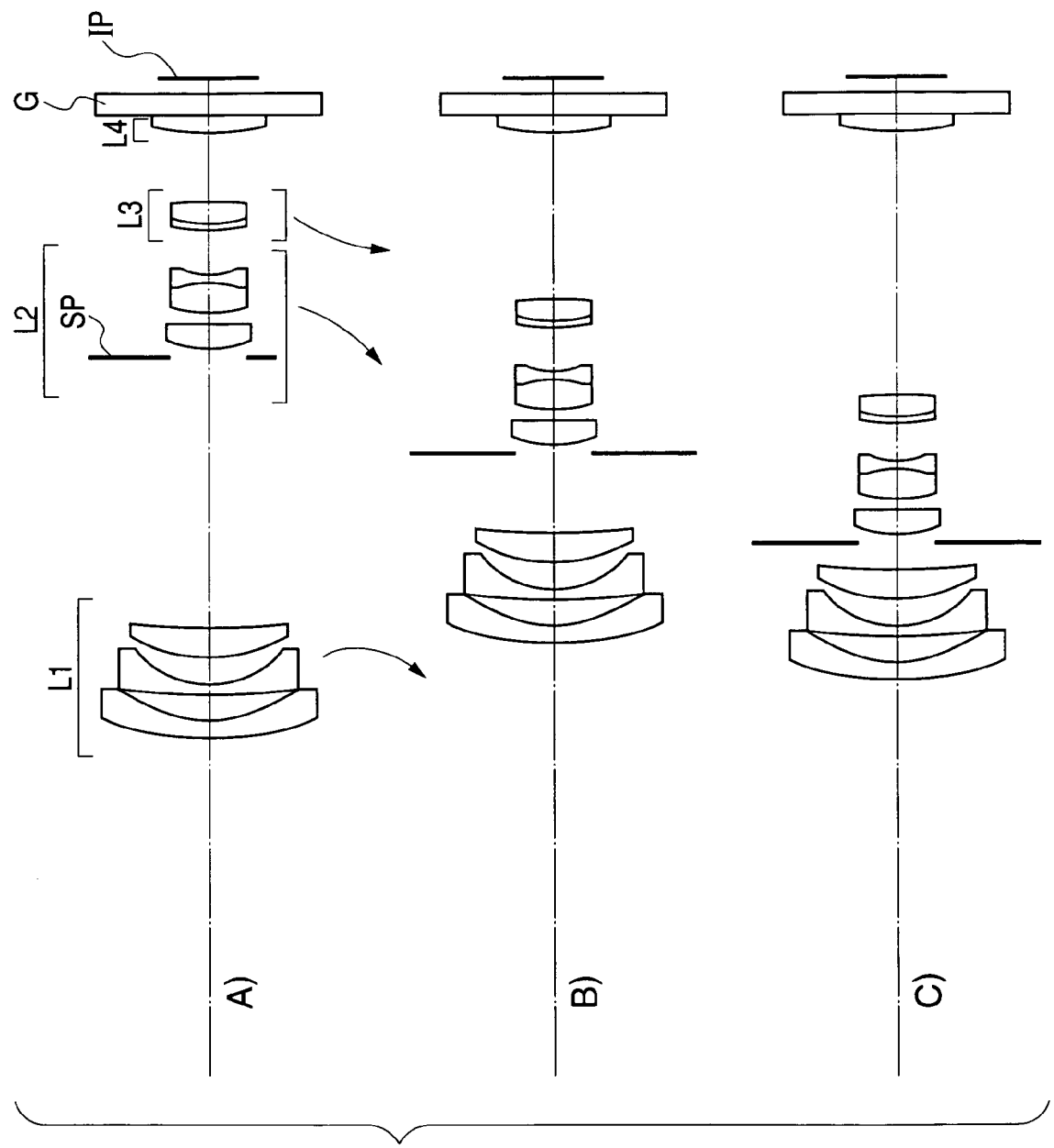
FIG. 1 is an optical sectional view showing a zoom lens system according to Embodiment 1 of the present invention.
Figure 2B:
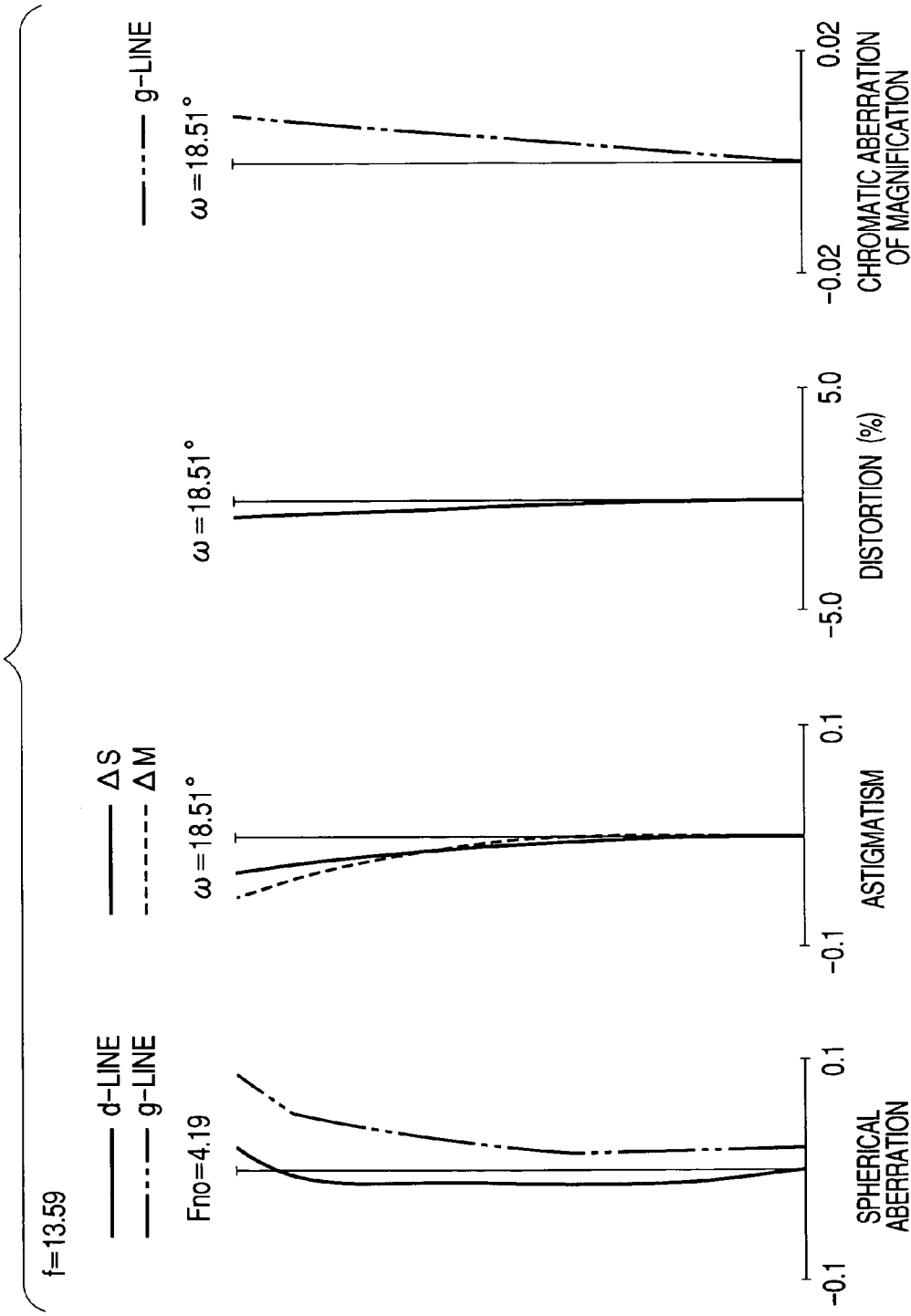
Figure 2C:
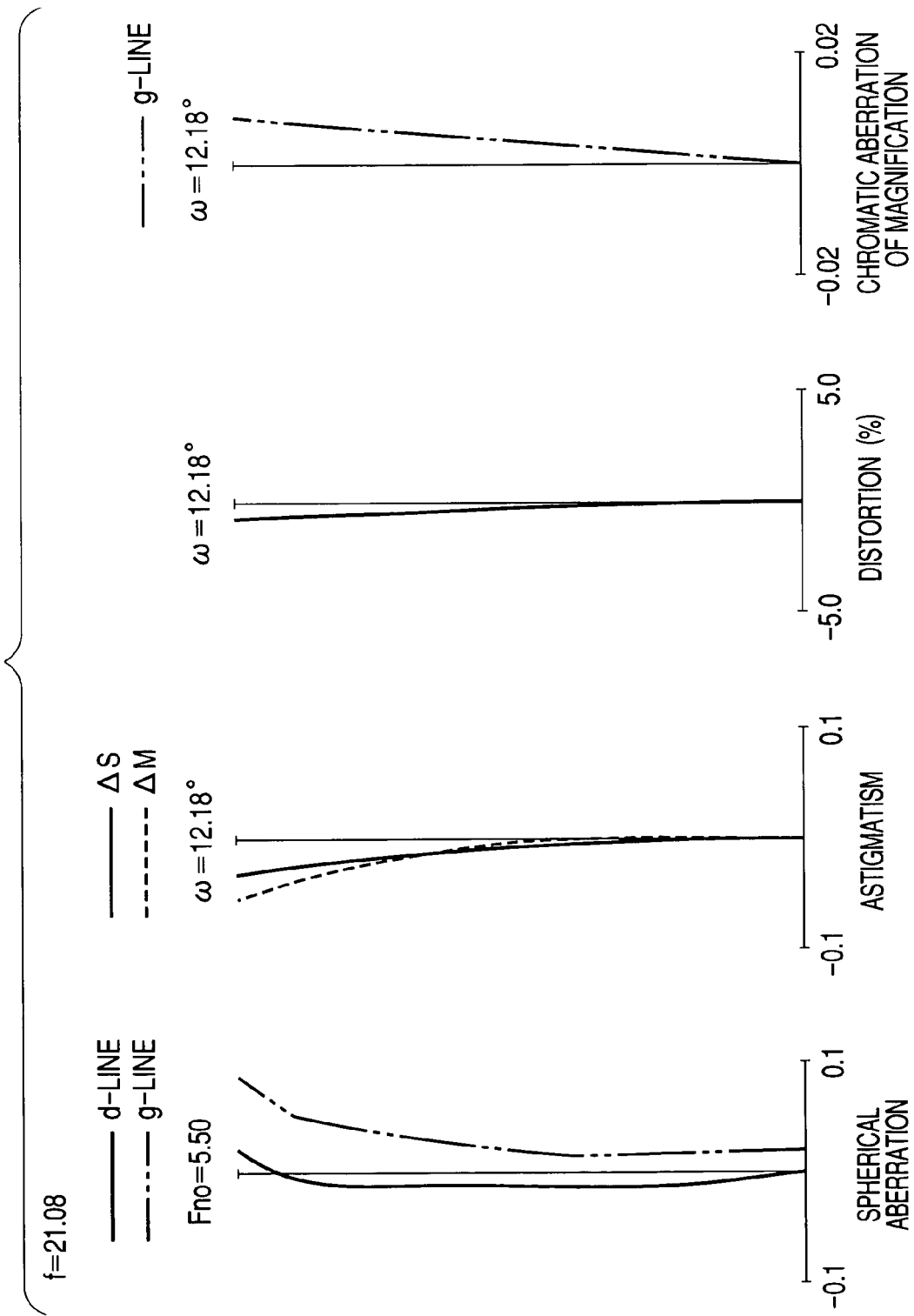

FIG. 1 is a lens sectional view showing a zoom lens system according to Embodiment 1 of the present invention. FIGS. 2A, 2B, and 2C are aberration graphs of the zoom lens system according to Embodiment 1 of the present invention at a wide angle end, at an intermediate zoom position, and at a telephoto end.

Figure 3:
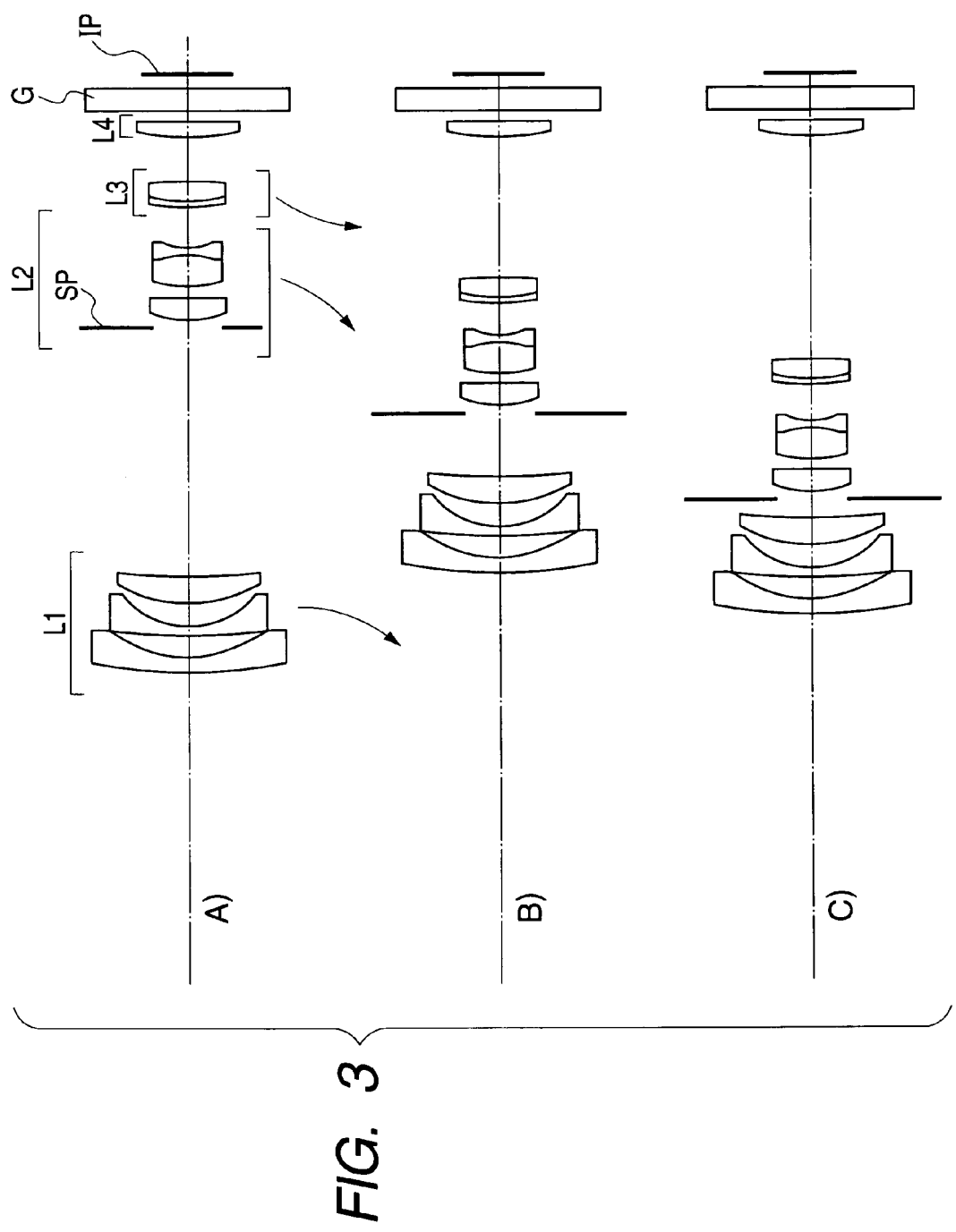
FIG. 3 is an optical sectional view showing a zoom lens system according to Embodiment 2 of the present invention.
Figure 4A:
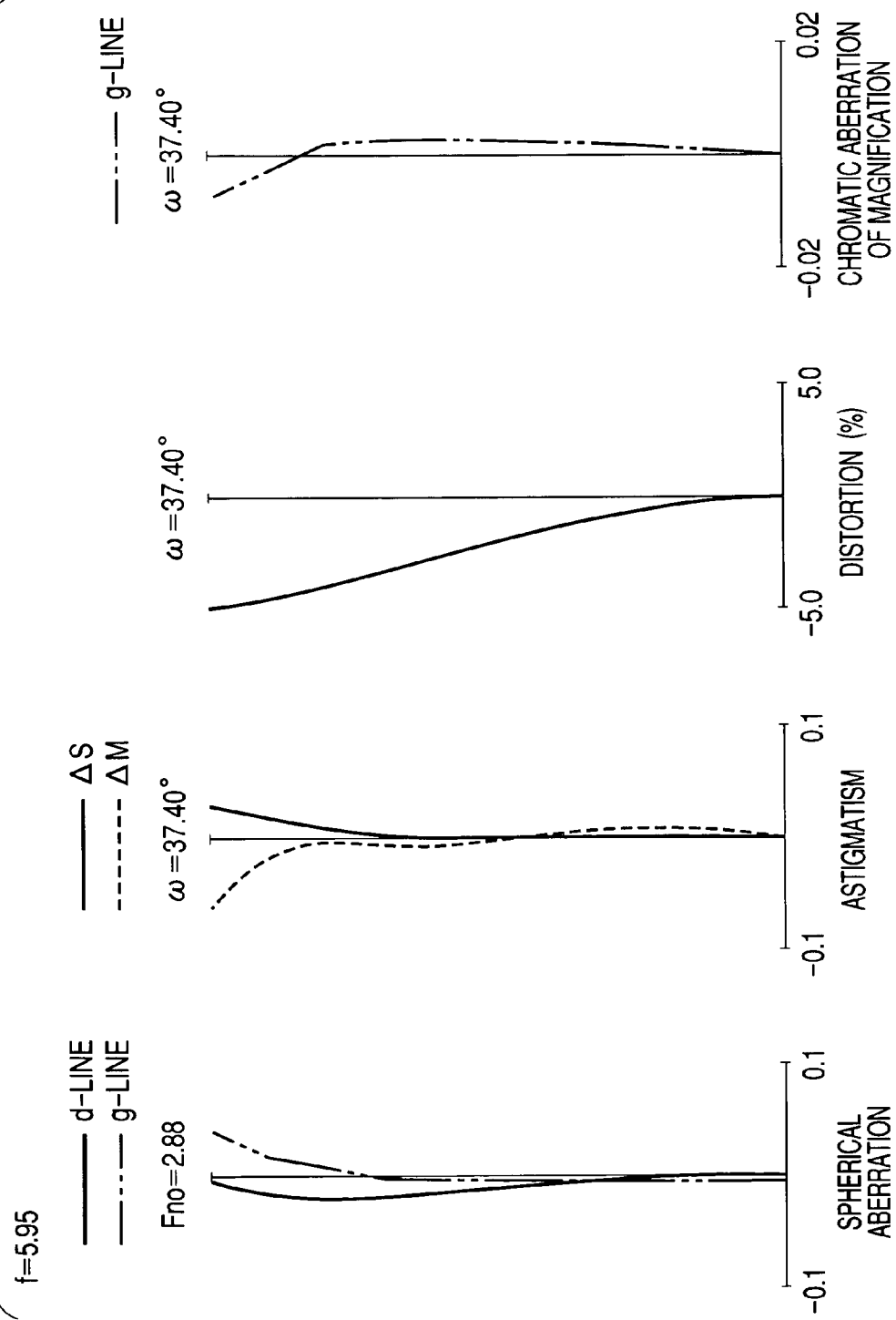
Figure 4B:
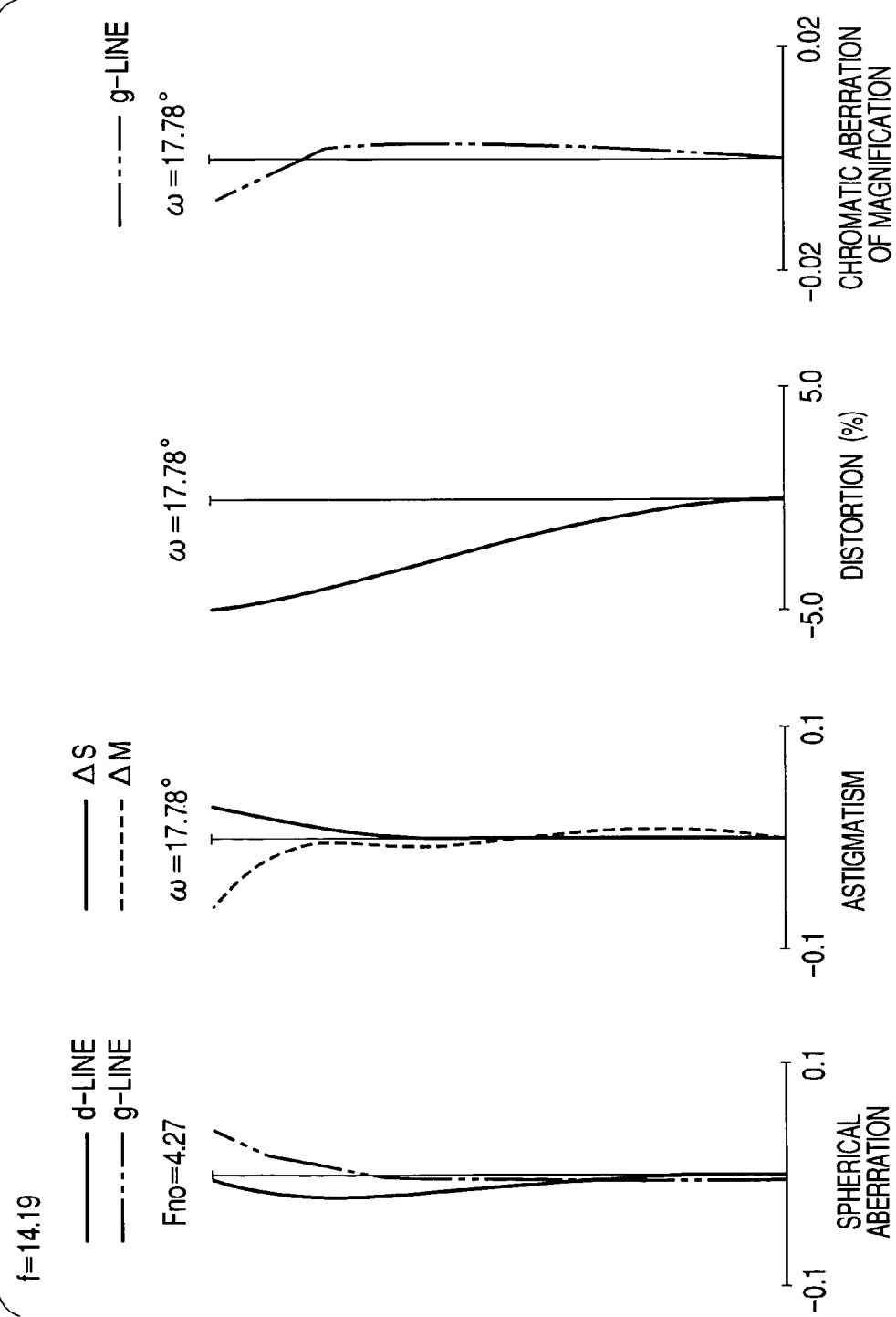

FIG. 3 is a lens sectional view showing a zoom lens system according to Embodiment 2 of the present invention. FIGS. 4A, 4B, and 4C are aberration graphs of the zoom lens system according to Embodiment 2 of the present invention, at a wide angle end, at an intermediate zoom position, and at a telephoto end.

Figure 5:
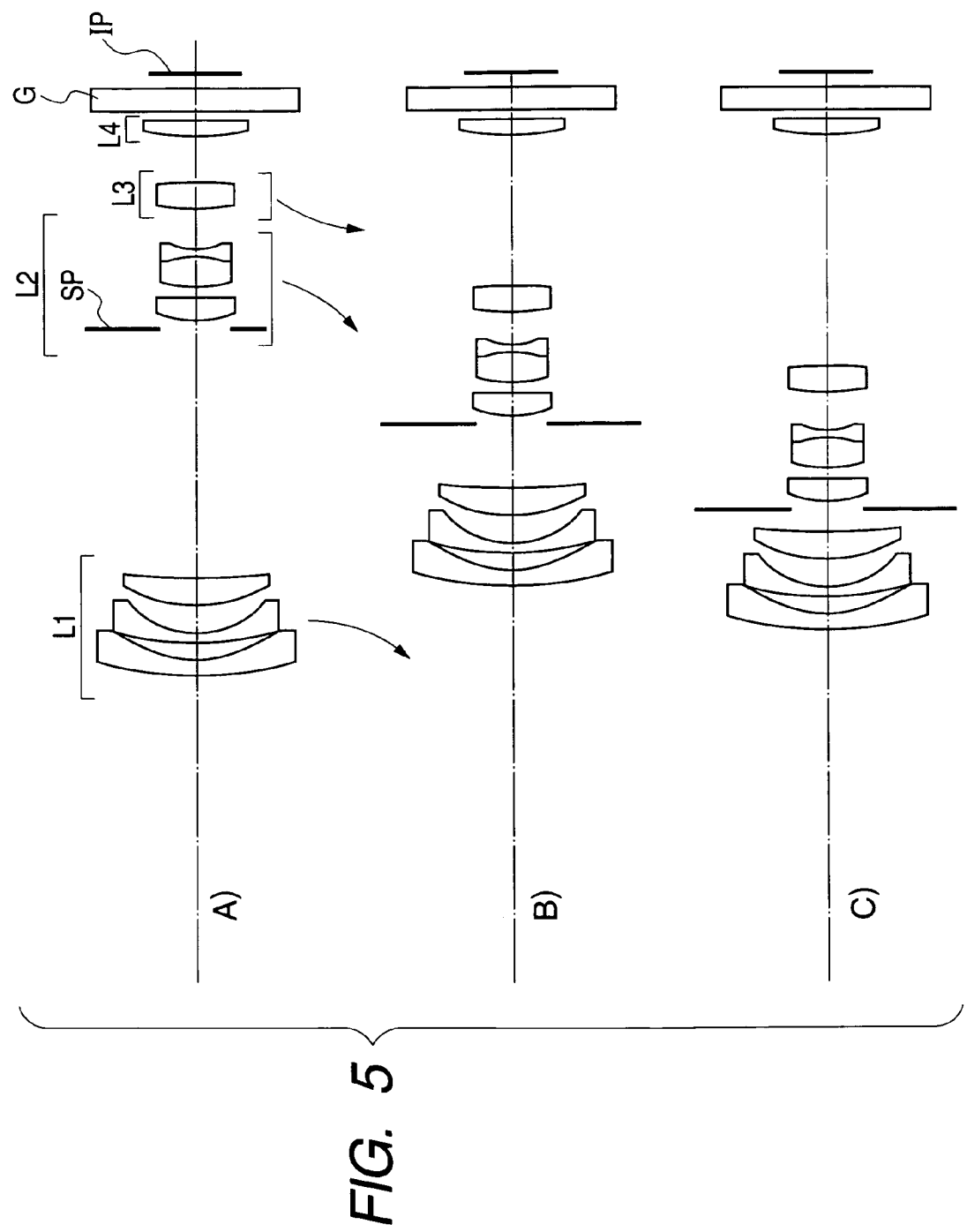
FIG. 5 is an optical sectional view showing a zoom lens system according to Embodiment 3 of the present invention.
Figure 6B:
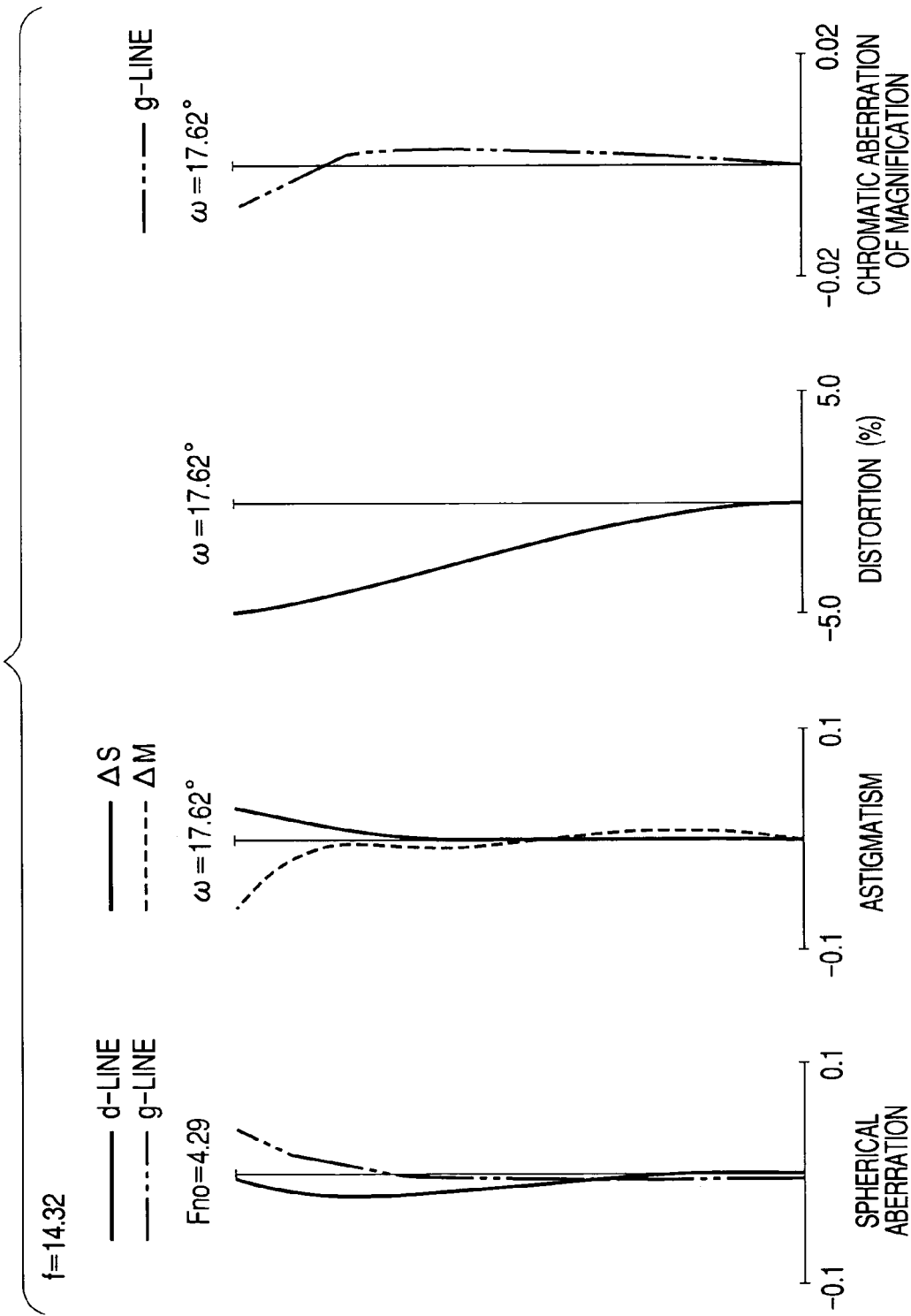

FIG. 5 is a lens sectional view showing a zoom lens system according to Embodiment 3 of the present invention. FIGS. 6A, 6B, and 6C are aberration graphs of the zoom lens system according to Embodiment 3 of the present invention at a wide angle end, at an intermediate zoom position, and at a telephoto end.

Figure 7:
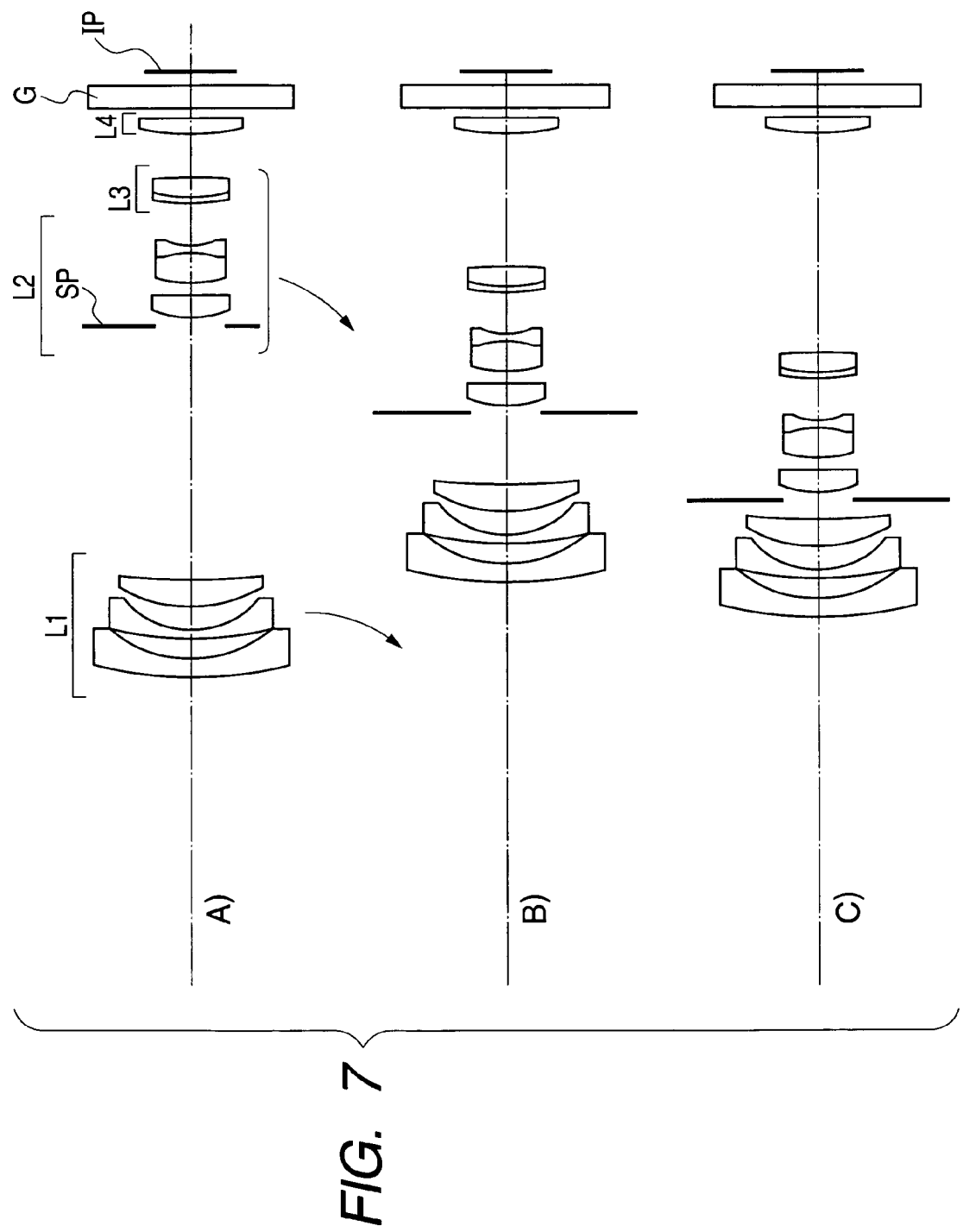
FIG. 7 is an optical sectional view showing a zoom lens system according to Embodiment 4 of the present invention.

FIG. 7 is a lens sectional view showing a zoom lens system according to Embodiment 4 of the present invention. FIGS. 8A, 8B, and 8C are aberration graphs of the zoom lens system according to Embodiment 4 of the present invention at a wide angle end, at an intermediate zoom position, and at a telephoto end.

Figure 9:
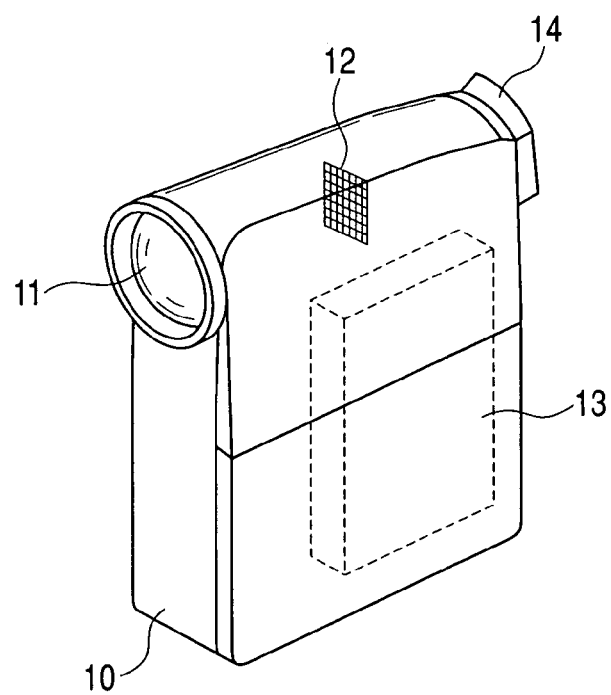
FIG. 9 is a main part schematic view showing a video camera.
Figure 10:
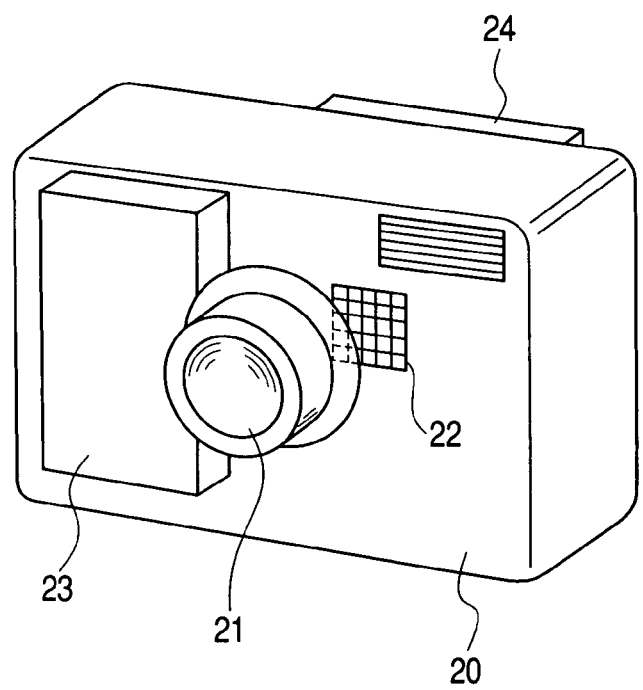
FIG. 10 is a main part schematic view showing a digital still camera.

FIG. 9 is a main part schematic view showing a video camera including the zoom lens system of the present invention. FIG. 10 is a main part schematic view showing a digital still camera including the zoom lens system of the present invention.

In the lens sectional views of FIGS. 1, 3, 5, and 7, (A) indicates the lens sectional view at the wide angle end, (B) indicates the lens sectional view at the intermediate zoom position, and (C) indicates the lens sectional view at the telephoto end.

The zoom lens system according to each of the embodiments is an image taking lens system used for an image pickup apparatus. The left-hand side in the lens sectional views is an object side (front) and the right-hand side therein is an image side (back). In the lens sectional views, L1 denotes a first lens unit having negative refracting power (optical power= the reciprocal of a focal distance), L2 denotes a second lens unit having positive refracting power, L3 denotes a third lens unit having positive refracting power, and L4 denotes a fourth lens unit having positive refracting power. SP denotes an aperture stop, which is located on the object side of the second lens unit L2.

G denotes an optical block which is disposed corresponding to an optical filter, a face plate, or the like in view of an optical design. IP denotes an image plane. When a zoom lens is used for an image taking optical system in a video camera or a digital still camera, an image pickup surface of a solid-state image pickup element (photoelectric conversion element) such as a CCD sensor or a CMOS sensor is taken as the image plane IP. When the zoom lens is used for an image taking optical system in a silver halide film camera, a photosensitive surface corresponding to a film surface is taken as the image plane IP.

In the aberration graphs, "d" and "g" denote a d-line and a g-line, respectively. ΔM and ΔS denote a meridional image surface and a sagittal image surface, respectively. A chromatic aberration of magnification is indicated by the g-line.

In the respective embodiments described below, the wide angle end and the telephoto end correspond to a zoom position at a time when a variable lens unit is located at one end of a movable range on an optical axis in view of a mechanism and a zoom position at a time when the variable lens unit is located at the other end of the movable range, respectively.

Note that, in Embodiment 4 shown in FIG. 7, the second lens unit L2 and the third lens unit L3 are integrally moved in zooming. Therefore, the second lens unit L2 and the third lens unit L3 are regarded as a single lens unit, so that the whole zoom lens can be used as a zoom lens which is composed of three lens units, that is, a lens unit having negative refracting power, a lens unit having positive refracting power, and a lens unit having positive refracting power.

Here, for the sake of convenience, the second lens unit L2 and the third lens unit L3 are regarded as separate lens units, so that the whole zoom lens is used as a zoom lens which is composed of four lens units.

In each of the embodiments, in zooming from the wide angle end to the telephoto end, the first lens unit L1 moves to the image side between the zoom position of the wide angle end and the intermediate zoom position. In addition, the first lens unit L1 moves to the object side between the intermediate zoom position and the zoom position of the telephoto end. That is, the first lens unit L1 moves along a portion of a trajectory (locus) which is convex toward the image side. The second lens unit L2 moves to the object side and the third lens unit L3 moves to the object side.

In each of the embodiments, the first lens unit L1 and the second lens unit L2 move such that an interval between the first lens unit L1 and the second lens unit L2 at the telephoto end becomes smaller than that at the wide angle end. In Embodiments 1 to 3, the third lens unit L3 independently moves to the object side. In Embodiment 4, the third lens unit L3 moves together with the second lens unit L2. The fourth lens unit L4 does not move for zooming.

The aperture stop SP is disposed between the second lens unit L2 and the third lens unit L3. In zooming, the aperture stop SP moves together with the second lens unit L2, thereby achieving simplification of the mechanical structure.

Focusing from an object at infinity onto a near object is performed by moving the third lens unit L3 toward the object side.

The first lens unit L1 includes a first lens, a second lens, and a third lens, which are disposed in the stated order from the object side to the image side. The first lens is formed in a meniscus shape which is convex on the object side, and has negative refracting power. The second lens is formed in a meniscus shape which is convex on the object side, and has negative refracting power. The third lens L3 is formed in a meniscus shape which is convex on the object side, and has positive refracting power. The surface of the first lens on the image side is an aspherical surface having a shape such that negative refracting power decreases from a lens central portion to a lens peripheral portion.

The second lens unit L2 includes a fourth lens and a cemented lens, which are disposed in the stated order from the object side to the image side. The fourth lens has positive refracting power. The cemented lens is composed of a fifth lens having positive refracting power and a sixth lens having negative refracting power, which are cemented to each other. The surface of the fifth lens on the object side is an aspherical surface.

In Embodiments 1, 2, and 4, the third lens unit L3 includes a cemented lens which is composed of a lens having negative refracting power and a lens having positive refracting power, which are cemented to each other. The lens having the negative refracting power is formed in a meniscus shape which is convex on the object side. Each of the lens surfaces of the lens having positive refracting power is a convex shape. In Embodiment 3, the third lens unit L3 is composed of a single lens having positive refracting power in which each of the lens surfaces thereof is a convex shape.

The fourth lens unit L4 is composed of a single lens having positive refracting power. In Embodiment 1, the fourth lens unit L4 is composed of a convex flat lens whose surface on the image side is flat, and is cemented to an optical filter such as a low pass filter which is provided between a photoelectric conversion element and a lens system.

In each of the embodiments, when a refractive index of a material constituting the first lens and a refractive index of a material constituting the second lens are given by Ng1 and Ng2, respectively, the conditional expressions, $1.78 < Ng1$ (1)

$1.75 < Ng2$ (2)

are satisfied.

The conditional expression (1) relates to the refractive index of the material of the first lens. When the refractive index of the material of the first lens becomes lower than a lower limit value of the conditional expression (1), it becomes difficult to correct a field curvature in a zoom region on the wide angle side, which is not preferable.

The conditional expression (2) relates to the refractive index of the material of the second lens. When the refractive index of the material of the second lens becomes lower than a lower limit value of the conditional expression (2), as in the case of the conditional expression (1), it becomes difficult to correct the field curvature in the zoom region on the wide angle side, which is not preferable.

It is more preferable to set numeral values of the conditional expressions (1) and (2) as follows.

$1.80 < Ng1$ (1a)

$1.82 < Ng2$ (2a)

In each of the embodiments, when an interval between the first lens unit L1 and the second lens unit L2 at the zoom position of the wide angle end and an interval therebetween at the zoom position of the telephoto end are given by d1w and d1t, respectively, and a focal distance of the entire system at the zoom position of the wide angle end is given by fw, the conditional expression, $2.5 < (d1w - d1t)/fw < 5.0$ (3)

is satisfied.

The conditional expression (3) is obtained by normalizing a change in interval between the first lens unit L1 and the second lens unit L2 in zooming from the wide angle end to the telephoto end by the focal distance at the wide angle end. When the change in interval between the first lens unit L1 and the second lens unit L2 becomes larger than an upper limit value of the conditional expression (3), the distance between the first lens unit L1 and the second lens unit L2 in the zoom region on the wide angle side increases, so that the diameter of the front lens becomes larger. Therefore, the size of the entire lens system increases, which is not preferable.

When the change in interval between the first lens unit L1 and the second lens unit L2 becomes smaller than a lower limit value of the conditional expression (3), it is necessary to increase optical power of each of the lens units to ensure a predetermined variable ratio. As a result, it becomes difficult to correct various aberrations across the entire zoom region in a favorable manner.

It is more preferable to set a numeral range of the conditional expression (3) as follows.

$3.2 < (d1w - d1t)/fw < 4.5$ (3a)

Hereinafter, Numerical Examples 1 to 4 respectively corresponding to Embodiments 1 to 4 of the present invention will be described. In each of Numerical Examples, "i" denotes the order of a surface from the object side, Ri denotes a curvature radius of each surface, Di denotes a thickness of a member or an air interval between an i-th surface and an (i+1)-th surface, Ni denotes a refractive index based on a d-line, and υi denotes an Abbe number based on the d-line. The two surfaces nearest to the image side are the surfaces of the glass block G. With respect to an aspherical shape, when a displacement in an optical axis direction at a position at a height H from an optical axis is given by X based on a surface vertex, X is expressed by the following expression, $$X = \frac{(1/R)H^2}{1 + \sqrt{1 - (1+K)(H/R)^2}} + AH^2 + BH^4 + CH^6 + DH^8 + EH^{10}$$

Here, R is a paraxial curvature radius, K is a conic constant, and A, B, C, D, and E are aspherical coefficients.

In addition, "e-0x" indicates "x10$^{-x}$", f denotes a focal length, Fno denotes an F number, and ω denotes a half view angle.

Table 1 shows a relationship between the respective conditional expressions described above and various numeral values in the numerical examples.

NUMERICAL EXAMPLE 1

| | | | | | | | | |
|---|---|---|---|---|---|---|---|---|
| \multicolumn{9}{c}{f = 5.99 to 21.08 Fno = 2.88 to 5.50 2ω = 74.4 to 24.4} |

| | | | | | | | |
|---|---|---|---|---|---|---|---|
| R1 = | 27.109 | D1 = | 1.70 | N1 = | 1.882997 | ν1 = | 40.8 |
| *R2 = | 10.667 | D2 = | 2.38 | | | | |
| R3 = | 56.020 | D3 = | 1.00 | N2 = | 1.882997 | ν2 = | 40.8 |
| R4 = | 8.807 | D4 = | 2.53 | | | | |
| R5 = | 13.612 | D5 = | 2.70 | N3 = | 1.846660 | ν3 = | 23.9 |
| R6 = | 62.331 | D6 = | Variable | | | | |
| R7 = | Diaphragm | D7 = | 0.80 | | | | |
| R8 = | 8.840 | D8 = | 2.30 | N4 = | 1.583126 | ν4 = | 59.4 |
| R9 = | −175.866 | D9 = | 0.97 | | | | |
| *R10 = | 10.174 | D10 = | 2.89 | N5 = | 1.727270 | ν5 = | 40.6 |
| R11 = | −11.872 | D11 = | 0.70 | N6 = | 1.728250 | ν6 = | 28.5 |
| R12 = | 5.796 | D12 = | Variable | | | | |
| R13 = | 19.490 | D13 = | 0.60 | N7 = | 1.804000 | ν7 = | 46.6 |
| R14 = | 11.945 | D14 = | 2.07 | N8 = | 1.516330 | ν8 = | 64.1 |
| R15 = | −43.377 | D15 = | Variable | | | | |
| R16 = | 20.962 | D16 = | 1.65 | N9 = | 1.583126 | ν9 = | 59.4 |
| R17 = | ∞ | D17 = | 0.00 | | | | |
| R18 = | ∞ | D18 = | 2.00 | N10 = | 1.516330 | ν10 = | 64.2 |
| R19 = | ∞ | | | | | | |

| Variable distance | Focal length | | |
|---|---|---|---|
| | 5.99 | 13.59 | 21.08 |
| D6 | 25.29 | 7.50 | 2.51 |
| D12 | 4.17 | 4.11 | 3.65 |
| D15 | 6.36 | 15.53 | 24.58 |

Aspherical Coefficient

Second surface: k=−1.29520e+00 A=0 B=4.93678e−05
 C=−1.03121e−06 D=5.09531e−10 E=−3.75769e−11

Tenth surface: k=−7.23181e−01 A=0 B=−1.19087e−04
 C=−2.26946e−06 D=−1.80388e−07 E=−3.39752e−09

NUMERICAL EXAMPLE 2

| | | | | | | | | |
|---|---|---|---|---|---|---|---|---|
| \multicolumn{9}{c}{f = 5.95 to 21.15 Fno = 2.88 to 5.50 2ω = 74.8 to 24.3} |

| | | | | | | | |
|---|---|---|---|---|---|---|---|
| R1 = | 46.505 | D1 = | 1.70 | N1 = | 1.802380 | ν1 = | 40.8 |
| *R2 = | 9.768 | D2 = | 2.06 | | | | |
| R3 = | 30.269 | D3 = | 1.00 | N2 = | 1.834807 | ν2 = | 42.7 |
| R4 = | 9.092 | D4 = | 2.34 | | | | |
| R5 = | 13.317 | D5 = | 2.70 | N3 = | 1.846660 | ν3 = | 23.9 |
| R6 = | 56.052 | D6 = | Variable | | | | |
| R7 = | Diaphragm | D7 = | 0.80 | | | | |
| R8 = | 9.093 | D8 = | 2.30 | N4 = | 1.583126 | ν4 = | 59.4 |
| R9 = | −208.028 | D9 = | 1.03 | | | | |
| *R10 = | 10.548 | D10 = | 3.22 | N5 = | 1.727270 | ν5 = | 40.6 |
| R11 = | −10.133 | D11 = | 0.70 | N6 = | 1.728250 | ν6 = | 28.5 |
| R12 = | 5.915 | D12 = | Variable | | | | |
| R13 = | 16.333 | D13 = | 0.60 | N7 = | 1.772499 | ν7 = | 49.6 |
| R14 = | 10.267 | D14 = | 2.08 | N8 = | 1.487490 | ν8 = | 70.2 |
| R15 = | −48.745 | D15 = | Variable | | | | |
| R16 = | 21.822 | D16 = | 1.65 | N9 = | 1.581439 | ν9 = | 40.8 |
| R17 = | −1220.307 | D17 = | 1.00 | | | | |
| R18 = | ∞ | D18 = | 2.40 | N10 = | 1.516330 | ν10 = | 64.2 |
| R19 = | ∞ | | | | | | |

| Variable distance | Focal length | | |
|---|---|---|---|
| | 5.95 | 14.19 | 21.15 |
| D6 | 26.07 | 6.65 | 2.20 |
| D12 | 4.24 | 3.26 | 3.81 |
| D15 | 4.52 | 14.71 | 22.81 |

Aspherical Coefficient
Second surface: k=−7.71857e−01 A=0 B=−2.03945e−05
  C=−1.32341e−06 D=1.04369e−08 E=−1.17459e−10
Tenth surface: k=−9.17419e−01 A=0 B=−8.46495e−05
  C=−3.23223e−06 D=−8.94850e−09 E=−2.69598e−09

NUMERICAL EXAMPLE 3

| f = 5.99 to 21.22 Fno = 2.88 to 5.50 2ω = 74.5 to 24.2 | | | | | | | |
|---|---|---|---|---|---|---|---|
| R1 = | 31.993 | D1 = | 1.70 | N1 = | 1.802380 | ν1 = | 40.8 |
| *R2 = | 9.752 | D2 = | 1.67 | | | | |
| R3 = | 30.104 | D3 = | 1.00 | N2 = | 1.834807 | ν2 = | 42.7 |
| R4 = | 8.610 | D4 = | 2.86 | | | | |
| R5 = | 13.573 | D5 = | 2.70 | N3 = | 1.846660 | ν3 = | 23.9 |
| R6 = | 44.148 | D6 = | Variable | | | | |
| R7 = | Diaphragm | D7 = | 0.80 | | | | |
| R8 = | 9.167 | D8 = | 2.30 | N4 = | 1.583126 | ν4 = | 59.4 |
| R9 = | −185.071 | D9 = | 1.15 | | | | |
| *R10 = | 10.575 | D10 = | 3.18 | N5 = | 1.727270 | ν5 = | 40.6 |
| R11 = | −11.707 | D11 = | 0.70 | N6 = | 1.728250 | ν6 = | 28.5 |
| R12 = | 5.908 | D12 = | Variable | | | | |
| R13 = | 21.517 | D13 = | 2.62 | N7 = | 1.496999 | ν7 = | 81.5 |
| R14 = | −58.326 | D14 = | Variable | | | | |
| R15 = | 18.929 | D15 = | 1.65 | N8 = | 1.487490 | ν8 = | 70.2 |
| R16 = | −1220.307 | D16 = | 1.00 | | | | |
| R17 = | ∞ | D17 = | 2.40 | N9 = | 1.516330 | ν9 = | 64.2 |
| R18 = | ∞ | | | | | | |

| Variable | Focal length | | |
|---|---|---|---|
| distance | 5.99 | 14.32 | 21.22 |
| D6 | 25.64 | 6.58 | 2.27 |
| D12 | 4.16 | 3.25 | 3.85 |
| D14 | 4.76 | 15.23 | 23.47 |

Aspherical Coefficient
Second surface: k=−6.89619e−01 A=0 B=−2.19308e−05
  C=−2.01588e−06 D=1.78555e−08 E=−1.62046e−10
Tenth surface: k=−8.67316e−01 A=0 B=−8.58964e−05
  C=−3.49228e−06 D=9.91722e−10 E=−2.01219e−09

NUMERICAL EXAMPLE 4

| f = 5.95 to 21.15 Fno = 2.88 to 5.50 2ω = 74.8 to 24.3 | | | | | | | |
|---|---|---|---|---|---|---|---|
| R1 = | 49.355 | D1 = | 1.70 | N1 = | 1.802380 | ν1 = | 40.8 |
| *R2 = | 9.772 | D2 = | 2.04 | | | | |
| R3 = | 30.308 | D3 = | 1.00 | N2 = | 1.834807 | ν2 = | 42.7 |
| R4 = | 9.097 | D4 = | 2.27 | | | | |
| R5 = | 13.305 | D5 = | 2.70 | N3 = | 1.846660 | ν3 = | 23.9 |
| R6 = | 60.923 | D6 = | Variable | | | | |
| R7 = | Diaphragm | D7 = | 0.80 | | | | |
| R8 = | 9.092 | D8 = | 2.30 | N4 = | 1.583126 | ν4 = | 59.4 |
| R9 = | −208.866 | D9 = | 1.13 | | | | |
| *R10 = | 10.586 | D10 = | 3.19 | N5 = | 1.727270 | ν5 = | 40.6 |
| R11 = | −9.612 | D11 = | 0.70 | N6 = | 1.728250 | ν6 = | 28.5 |
| R12 = | 5.959 | D12 = | 4.24 | | | | |
| R13 = | 17.117 | D13 = | 0.60 | N7 = | 1.772499 | ν7 = | 49.6 |
| R14 = | 11.001 | D14 = | 2.03 | N8 = | 1.487490 | ν8 = | 70.2 |
| R15 = | −48.018 | D15 = | Variable | | | | |
| R16 = | 22.166 | D16 = | 1.65 | N9 = | 1.581439 | ν9 = | 40.8 |
| R17 = | −1220.307 | D17 = | 1.00 | | | | |
| R18 = | ∞ | D18 = | 2.40 | N10 = | 1.516330 | ν10 = | 64.2 |
| R19 = | ∞ | | | | | | |

| Variable | Focal length | | |
|---|---|---|---|
| distance | 5.95 | 13.55 | 21.15 |
| D6 | 26.23 | 7.43 | 2.15 |
| D15 | 4.44 | 13.47 | 22.51 |

Aspherical Coefficient

Second surface: k=−1.08887e+00 A=0 B=−1.80057e−05 C=−1.43826e−06 D=1.46413e−08 E=−1.52379e−10

Tenth surface: k=−8.84982e−01 A=0 B=−8.76118e−05 C=−6.35206e−06 D=3.80462e−07 E=−1.89851e−08

TABLE 1

| Example | Conditional Expression | | |
|---|---|---|---|
| Numerical value | 1 Ng1 | 2 Ng2 | 3 (d1w − d1t)/fw |
| 1 | 1.883 | 1.883 | 3.80 |
| 2 | 1.802 | 1.835 | 4.01 |
| 3 | 1.803 | 1.835 | 3.90 |
| 4 | 1.802 | 1.835 | 4.05 |

As described above, according to the respective embodiments, in the zoom lens system having three or more lens units (a lens unit with negative refracting power, a lens unit with positive refracting power, and a lens unit with positive refracting power), the lens structure of the each of the lens units, a position of the aspherical surface, a moving method for zooming, and the like are optimized. Therefore, the number of lenses is reduced and the length of the entire zoom lens system is shortened. Despite such arrangement, the zoom lens system has a wide view angle equal to or larger than 70 degrees at the wide angle end and a variable ratio of about 3 to 4, ensures brightness, and provides a high optical performance, making it suitable for use in a video camera, a digital still camera, and the like.

Next, a video camera using the zoom lens system of the present invention as an image taking optical system and a digital still camera using the zoom lens system according to an embodiment of the present invention will be described with reference to FIGS. 9 and 10.

In FIG. 9, the video camera includes a video camera main body 10, an image taking optical system 11, a solid-state image pickup element (photoelectric conversion element) 12 such as a CCD sensor or a CMOS sensor, a memory 13, and a finder 14. The image taking optical system 11 is composed of the zoom lens system of the present invention. The solid-state image pickup element 12 receives a subject image through the image taking optical system 11. The memory 13 stores information corresponding to the subject image, which is photoelectrically converted by the solid-state image pickup element 12. The finder 14 is used for observing the subject image displayed on a display element (not shown). The display element is composed of a liquid crystal panel or the like and displays the subject image formed on the solid-state image pickup element 12.

In FIG. 10, the digital still camera includes a camera main body 20, an image taking optical system 21, a solid-state image pickup element (photoelectric conversion element) 22 such as a CCD sensor or a CMOS sensor, a memory 23, and a finder 24. The image taking optical system 21 is composed of the zoom lens system of the present invention. The solid-state image pickup element 22 is incorporated in the camera main body 20 and receives a subject image formed by the image taking optical system 21. The memory 23 stores information corresponding to the subject image, which is photoelectrically converted by the solid-state image pickup element 22. The finder 24 is composed of a liquid crystal display panel or the like and used for observing the subject image formed on the solid-state image pickup element 22.

As described above, when the zoom lens system of the present invention is applied to an image pickup device such as the video camera and the digital still camera, a small size image pickup device having a high optical performance can be realized.

What is claimed is:

1. A zoom lens system, comprising:
   a first lens unit having negative optical power, the first lens unit including a first lens element having negative optical power, a second lens element having negative optical power, and a third lens element having positive optical power, which are disposed in order from an object side to an image side, the first lens element having an aspherical surface of a shape that the negative optical power decreases from a lens central portion to a lens peripheral portion, the second lens element being formed in a meniscus shape which is convex on the object side;
   a second lens unit having positive optical power; and
   a third lens unit having positive optical power,
   wherein the first lens unit, the second lens unit, and the third lens unit are disposed in order from the object side to the image side,
   wherein the second lens unit is moved toward the object side in zooming from a wide angle end to a telephoto end such that an interval between the first lens unit and the second lens unit at the telephoto end becomes smaller than an interval between the first lens unit and the second lens unit at the wide angle end, and
   wherein the following conditions are satisfied, $1.78 < Ng1$ and $1.75 < Ng2$ where Ng1 is a refractive index of a material constituting the first lens element and Ng2 is a refractive index of a material constituting the second lens element.

2. A zoom lens system according to claim 1, wherein the first lens unit and the third lens unit move in zooming.

3. A zoom lens system according to claim 1, wherein the following condition is satisfied, $2.5 < (d1w - d1t)/fw < 5.0$ where d1w and d1t are an interval between the first lens unit and the second lens unit at a zoom position of the wide angle end and an interval between the first lens unit and the second lens unit at a zoom position of the telephoto end, respectively, and fw is a focal length of an entire system at the wide angle end.

4. A zoom lens system according to claim 1, wherein the first lens unit is moved along a portion of a trajectory which is convex to the image side in the zooming from the wide angle end to the telephoto end.

5. A zoom lens system according to claim 1, further comprising an aperture stop moved together with the second lens unit in zooming.

6. A zoom lens system according to claim 1, wherein the first lens element has a meniscus shape which is convex on the object side and the third lens element has a meniscus shape which is convex on the object side.

7. A zoom lens system according to claim 1, wherein a surface of the first element on the image side is the aspherical surface.

8. A zoom lens system according to claim 1, wherein the second lens unit consists of a fourth lens element and a cemented lens, which are disposed in order from the object side to the image side, the fourth lens having positive optical power, the cemented lens comprising a fifth lens having positive optical power and a sixth lens having negative optical power that are cemented to each other, and wherein the cemented lens has an aspherical surface.

9. A zoom lens system according to claim 1, further comprising a fourth lens unit having positive optical power, which is disposed on the image side of the third lens unit.

10. A zoom lens system according to claim 1, wherein the zoom lens system forms an image on a photoelectric conversion element.

11. An image pickup apparatus, comprising:
a zoom lens system according to claim 1; and
a photoelectric conversion element for receiving an image formed by the zoom lens system.

* * * * *